Figures 1, 2:
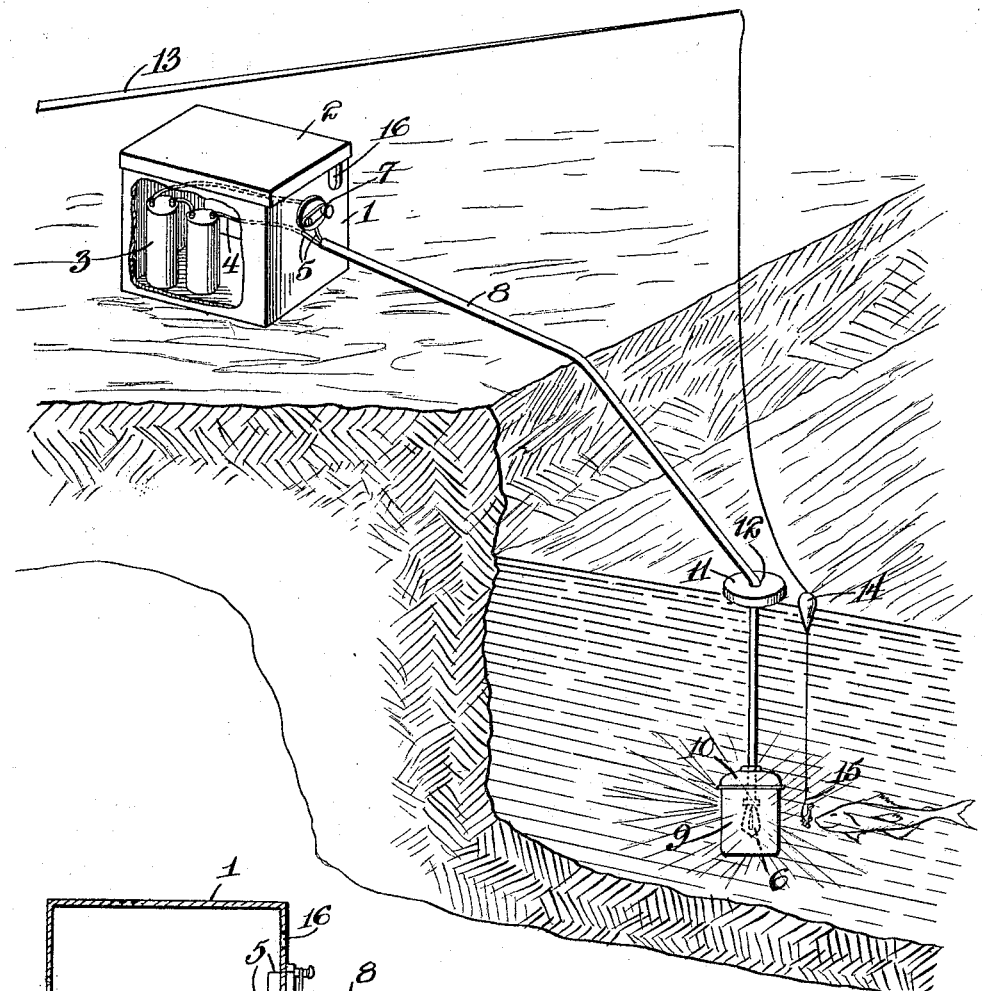

W. J. RYAN.
FISHING APPARATUS.
APPLICATION FILED JAN. 3, 1914. RENEWED MAY 27, 1916.

1,192,001.

Patented July 25, 1916.

UNITED STATES PATENT OFFICE.

WILLIAM J. RYAN, OF SAPULPA, OKLAHOMA.

FISHING APPARATUS.

1,192,001.

Specification of Letters Patent.

Patented July 25, 1916.

Application filed January 3, 1914, Serial No. 810,248. Renewed May 27, 1916. Serial No. 100,376.

*To all whom it may concern:*

Be it known that I, WILLIAM J. RYAN, a citizen of the United States, residing at Sapulpa, in the county of Creek and State of Oklahoma, have invented certain new and useful Improvements in Fishing Apparatus, of which the following is a specification.

My invention relates to a fishing apparatus.

The primary object of my invention is to provide a luminous device to be used in connection with an ordinary hook and line for the purpose of attracting fish and causing them to come from under drifts and other hiding places to the open where they may be easily caught by the use of the hook and line.

Another object of my invention is to provide a novel means for adjustably holding a light at any desired depth in a body of water.

A further object of my invention is to provide an improved means for preventing wires from contact with the water and to protect the light proper from contact with debris or the like.

A still further object of my invention is to provide an improved portable means for transporting the device from place to place.

A still further object of my invention is to provide a device that is simple in construction, efficient in operation, and one that can be manufactured and placed upon the market at a minimum cost.

Other objects as well as the nature, characteristic features, and scope of my invention will be clear from the following description taken in connection with the accompanying drawings.

In the drawings: Figure 1, is a perspective view of my device in use. Fig. 2, is a horizontal, sectional view of my invention.

Referring more particularly to the drawings in which similar reference numerals designate like or corresponding parts, the numeral 1, designates a receptacle having a cover 2, which receptacle and cover are formed preferably of wood and in which receptacle are arranged batteries 3. The batteries are connected by means of wires 4, which extend through the openings 5, arranged in one of the sides of the receptacle and have connected on their outer ends a lamp 6. In order to control the passage of the current through the wires, I have secured to the outer surface of the receptacle adjacent one of the openings 5, a switch 7, and connected one of the wires thereto as clearly shown in the drawings.

For the purpose of preventing the wires from having contact with the water in which the same in the lamp are adapted to be disposed for the purpose of attracting the fish, I have mounted about the same an elongated piece of rubber tubing 8, which extends from a point adjacent the switch 7 to the lamp 6. In order to protect the lamp 6, which is of very fragile material, I have mounted in close proximity to the same on the rubber tubing 8, a transparent protective casing which consists essentially of a glass jar 9, having a removable cover 10. The thickness of the glass of which the jar is formed is less likely to break when coming in contact with a small article or other debris than the glass of which the lamp is formed.

For the purpose of holding the lamp and its protective casing at any desired depth in the water, I have slidably mounted about the tubing 8, a circular disk float 11, formed preferably of cork, by means of an opening 12, centrally disposed in the disk, the opening being arranged in close relation with the surface of the tubing for substantial frictional engagement therewith. It must be understood that the float is of sufficient diameter to withstand the weight of the lamp and its protective casing.

In Fig. 1, of the drawings I have shown my invention in use and the manner in which the ordinary fishing pole 13 and its accessories are used in connection with the same, a float 14, being disposed adjacent that float 11 and a hook 15, with a suitable bait thereon being disposed in close relation to the jar 9.

In order to allow casing disk, float, and tubing to be placed in the receptacle 1, I have provided the upper edge of one of the sides thereof adjacent the switch with a longitudinal slot 16, which extends below the marginal edge of the cover so as to receive the tubing 6.

I desire it to be understood that the coefficient of flexibility of the line conducting structure comprising the wires and tubing, is such, that it will not bend under stress imposed by the flow or current of the water and while the conductor is capable of being bent or coiled its resistance against coil or bending is such as to render it self-sustaining against like strains. Another feature is that the point of flexure of the tubing 8, will anchor the float against upward movement and prevent the tubing or line conducting structure from having sliding movement due to the accidental movement of the casing suspended from the float. It will also be noted that I have provided a receptacle having a source of current which serves the dual purpose of securely anchoring the device when in use and forming means for transporting the same when not in use.

It will be obvious to those skilled in the art to which this invention relates that modifications may be made in details without departing from the spirit or scope of my invention.

Having thus fully described my invention what I claim as new and desire to secure by Letters Patent is;

In a fishing apparatus a shore anchoring means including a holder and a source of current, a lamp, a conductor connecting said lamp and said source of current, a tube disposed about said conductor for protecting the conductor from contact with water, said conductor and said tube being of sufficient rigidity to resist flexure under flow of current to hold said lamp in its position of adjustment in a stream from the shore line, a transparent protective casing carried by said conductor in proximity to said lamp and encompassing said lamp, a disk float having an opening therein, said float being slidably and frictionally mounted on the tube through the medium of the opening and held in adjusted position at a bend of flexure thereon, and said float holding said lamp at a desired depth in a stream and being prevented from having sliding movement on the tube by the bend of flexure when the casing is accidentally moved.

In testimony whereof I affix my signature in presence of two witnesses.

WILLIAM J. RYAN.

Witnesses:
   JAMES J. MARS,
   S. H. FAHEY.